United States Patent [19]

Asakura et al.

[11] 4,368,088
[45] Jan. 11, 1983

[54] METHOD OF MANUFACTURING CORRUGATED TUBE

[75] Inventors: Hiroshi Asakura, Oiso; Masaharu Kusaka, Yokosuka; Mituto Hirata; Akio Machihara, both of Yokohama, all of Japan

[73] Assignee: Toyo Kagaku Kabushiki Kaisha, Kamakura, Japan

[21] Appl. No.: 213,720

[22] Filed: Dec. 8, 1980

[30] Foreign Application Priority Data

Dec. 20, 1979 [JP] Japan .............................. 54/164689

[51] Int. Cl.³ .................. B65H 81/00; F16L 11/08
[52] U.S. Cl. ................... 156/143; 138/122; 138/132; 156/195; 156/244.12; 156/244.13
[58] Field of Search .............. 156/143, 195, 428, 429, 156/171, 244.12, 244.13, 244.11, 285, 244.2, 244.27; 138/122, 154, 138, 132, 133, 173

[56] References Cited

U.S. PATENT DOCUMENTS

| | | | |
|---|---|---|---|
| 3,047,026 | 7/1962 | Kahn | 138/122 |
| 3,117,596 | 1/1964 | Kahn | 156/143 |
| 3,173,822 | 3/1965 | Rigaut | 156/244.15 |
| 3,532,580 | 10/1970 | Kanao | 156/428 |
| 3,671,348 | 6/1972 | Kemsey-Bourne | 156/195 |
| 3,739,815 | 6/1973 | Rejeski | 138/122 |
| 3,890,181 | 6/1975 | Stent et al. | 156/143 |
| 3,994,761 | 11/1976 | Higbee | 156/156 |
| 4,154,636 | 5/1979 | Motoyama et al. | 156/285 |

Primary Examiner—Michael W. Ball
Attorney, Agent, or Firm—Jordan and Hamburg

[57] ABSTRACT

A method of continuously manufacturing a corrugated tube having a corrugated outer wall and a smooth inner wall surface along the length of the tube is provided which method comprises the steps of arranging in a circular array a plurality of rollers each rotating at the same speed such that an imaginary cylinder is defined about its central axis by said rollers, the longitudinal axes of said rollers being parallel to each other but offset with respect to said central axis; continuously feeding a flat non-reinforced strip of synthetic resin material in a softened state generally perpendicularly to the length of said rollers in such a manner that said strip is helically wrapped around and advanced axially along said imaginary cylinder with portions of adjacent turns of the strip overlapping one on another and welded together; continuously feeding a flexible core member and embedding it between the overlapping portions of adjacent turns of the strip to raise the upper one of said overlapping portions so as to define spiral raised convolutions around the tube; and pressing a pressure roller against the overlappin portions of the strip having said flexible core member embedded therein; whereby a corrugated tube is formed having spiral convolutions defined by the embedded flexible core member around the outer periphery of the tube along the length thereof and a smooth inner wall surface.

8 Claims, 6 Drawing Figures

METHOD OF MANUFACTURING CORRUGATED TUBE

BACKGROUND OF THE INVENTION

1. Field of the Invention

This invention relates to a method of producing a corrugated tube made of synthetic resin, and more particularly to a method of manufacturing, on a continuous basis, a corrugated tube the outer wall of which is corrugated in longitudinal cross-section and the inner wall of which has a smooth surface.

2. Prior Art

As is well known, tubes made of synthetic resin are widely used as various structural members, piping, drainage pipes and the like because they have higher corrosion-resistance, chemical resistance and non-magnetic properties in addition to being of light weight and having higher flexibility, as compared to metal tubes. On the other hand, such synthetic resin tubes have the disadvantage that they provide less crushing strength against exterior pressure due to their flexibility. If they are buried as drainage pipes in the earth, they are susceptible to deformation and failure under an external pressure.

As one of approaches to overcoming the foregoing drawbacks, synthetic resin tubes having tube walls corrugated so as to enhance their crushing strength against exterior pressure have been developed and heretofore put to practice in many applications.

These flexible convoluted or corrugated synthetic resin tubes have either convolutions helically extending or convolutions symmetric with respect to the axis of the tube. In either case, such convolutions are formed by shaping concave-convex or undulating formations in the tube wall, and corrugated tubes may be provided with some degree of crushing strength while maintaining necessary flexibility or pliability by selecting the depth and pitch of the convolution, the thickness of the tube wall, etc., apart from the selection of the material of which the tube is formed. Nevertheless, the corrugated tube may not offer strong resistance when crushed by an exterior pressure as it tends to expand or contract between adjacent convolutions for the lack of any solid connection between the adjacent convolutions. This is true particularly when the tube has an enlarged diameter or when adequate flexibility is required of the tube.

In addition, when the corrugated tubes having undulating tube walls necessarily formed by corrugations are used as drainage pipes, for example, the crests of the corrugations provide obstructions to the flow of liquids while deposits tend to collect in the valleys of the corrugations, thus resulting in greatly deteriorating the function of the drainage pipe.

A method of producing a corrugated tube having a convoluted outer wall and a smooth inner wall is known as per U.S. Pat. No. 3,671,348. According to this known method, a pair of strip members of synthetic resin are extruded at the same speed with a profiling insert such as a rigid hollow member or a rope for forming convolutions sandwiched between and heat sealed to the strip members to form a single ply strip having a profiling insert embedded therein and extending longitudinally therealong. This strip is then helically wrapped onto a rotating mandrel while moving the mandrel in the axial direction such that the edges of the adjacent turns of the strip are overlapped and welded together. When the strip is wrapped around the mandrel along its full length to form a length of corrugated tube, the tube is removed from the mandrel. However, this method requires the use of two strip members and complicated operation and control for extruding the two strip members at the same speed and embedding an insert therebetween. Furthermore, in this method the strip is wrapped around the mandrel while displacing the latter, so that only a length of corrugated tube corresponding to the length of the mandrel can be produced in one operation. Moreover, great difficulties are involved in withdrawing the finished corrugated tube from the mandrel. The longer the mandrel, the more difficult is it to remove the tube from the mandrel. For these reasons, the method described above is not a practical method.

In addition, when it is desired to change the wall thickness of the finished tube, the dies for extruding strip members must be replaced with different dies for extruding thicker or thinner plastics strip members, which is a time-consuming procedure.

Still another disadvantage is that since two strip members are welded together by a profiling pressure roller with a profiling insert embedded between the strip members, the convolutions may be collapsed or otherwise improperly formed unless the insert is sufficiently rigid.

OBJECTS AND SUMMARY OF THE INVENTION

An object of the present invention is to provide a method of producing a corrugated tube having an increased resistance to crush under an external pressure.

Another object of the invention is to provide a method of producing a corrugated tube so constructed that it will offer no interference with the passage of liquid therethrough and that deposits will be prevented from collecting in the tube.

Still another object of the invention is to provide a method of manufacturing a corrugated tube from a single strip by simple operations and on a continuous basis, the tube having an undulating outer wall and a smooth inner wall surface.

Yet another object of the present invention is to provide a process for producing a corrugated tube in which the wall thickness of the tube to be produced may easily be changed.

Another object of the invention is to provide a method of producing a corrugated tube having a shaped undulating outer wall.

Another object of the present invention is to provide a method of producing a corrugated tube having an undulating outer wall which offers adequate resistance to crush.

The above and other objects of the invention will become apparent from the following description when taken in conjunction with the accompanying drawings.

According to the present invention, there is provided a method of continuously manufacturing a corrugated tube having axially extending spiral convolutions to define a corrugated outer wall configuration in longitudinal cross-section and a smooth inner wall surface along the length of the tube, comprising the steps of arranging in a circular array a plurality of rollers each rotating at the same speed such that an imaginary cylinder is defined about a central axis by said rollers, the longitudinal axes of said rollers being parallel to each other but offset with respect to said central axis; continuously feeding a flat non-reinforced strip of synthetic resin material in a softened state generally perpendicularly to the length of said rollers in such a manner that said strip is helically wrapped around and advanced axially along said imaginary cylinder with portions of adjacent turns of the strip overlapping one on another and welded together; continuously feeding a flexible core member and embedding it between the overlapping portions of adjacent turns of the strip to raise the upper one of said overlapping portions so as to define spiral raised convolutions around the tube; and pressing a pressure roller against the overlapping portions of the strip having said flexible core member embedded therein, whereby a corrugated tube is formed having spiral convolutions defined by the embedded flexible core member around the outer periphery of the tube along the entire length thereof and a smooth inner wall surface.

PREFERRED EMBODIMENTS OF THE INVENTION

Figure 1:
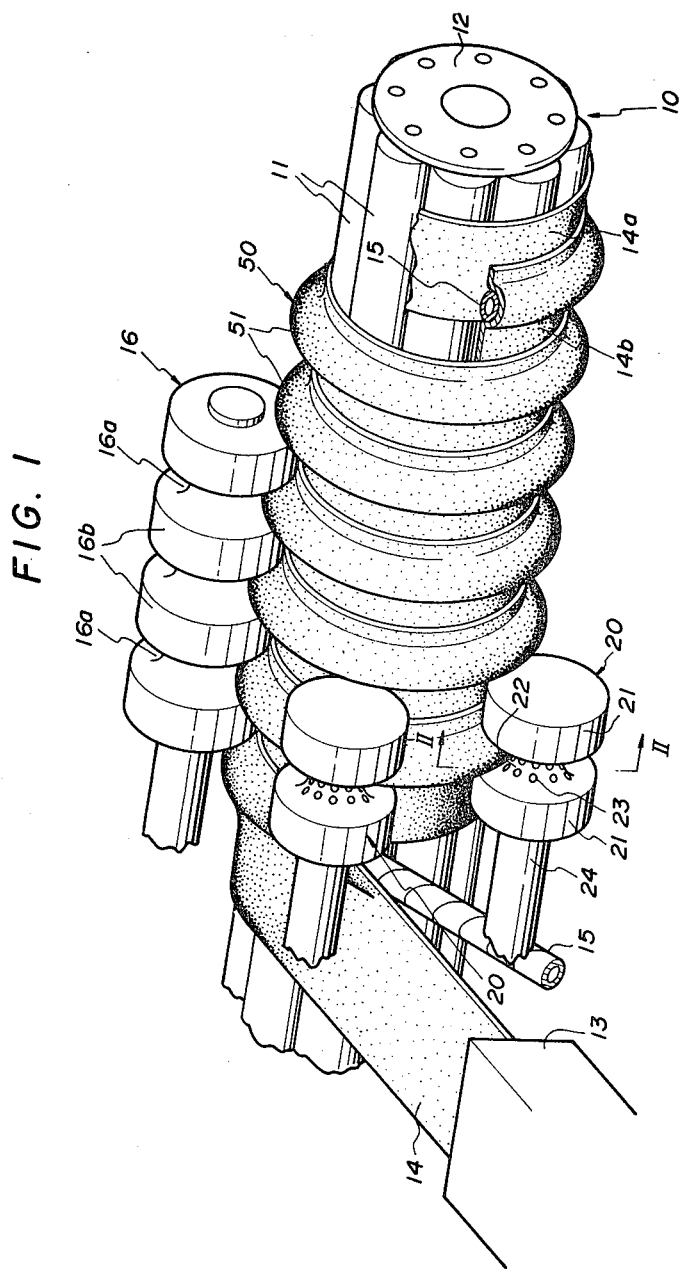
FIG. 1 is a partially broken away perspective view illustrating a corrugated tube being produced according to the method of the present invention.

Referring to FIG. 1, a mandrel used for practicing the method according to the present invention is generally indicated by 10. This type of mandrel is described in U.S. Pat. No. 3,532,580 which is incorporated herein by reference. The mandrel 10 comprises a plurality of rotating rollers 11 arranged in a circular array and rotatably journalled in an end plate 12, said rollers together defining an imaginary cylinder. The longitudinal axes of the rollers 11 are aligned in parallel to each other but offset with respect to the central axis of the imaginary cylinder, so that a strip 14 of polyethylene extruded through a die 13 and fed onto the mandrel 10 is helically advanced along the length of the mandrel while concurrently it is wrapped around the mandrel.

The strip 14 is fed substantially tangentially onto the periphery of the mandrel with the axis of the strip at a predetermined angle with respect to the axis of the mandrel such that the succeeding turn 14b of the strip partially overlaps the preceding turn 14a while at the same time a flexible core member 15 is passed beneath and parallel to the length of the strip being fed so as to be embedded between the overlapping portions of the preceding turn 14a and the succeeding turn 14b. The preceding turn 14a of the strip is spreaded flat against the periphery of the mandrel to present a smooth surface while that portion of the succeeding turn 14b overlapping the corresponding portion of the preceding turn is curved or corrugated in conformity with the cross-sectional shape of the core member 15 as the edge portion of the succeeding turn envelops the core member.

A pressure roller 16 is urged into rolling contact with the overlapping portions of the strip turns having the core member 15 embedded therebetween to bond the overlapping portions together and to bond the overlapping portions to the embedded core member. In the illustrated embodiment the pressure roller 16 is formed with a series of annular recesses 16a around its periphery spaced apart from each other to receive and press against the corresponding convolutions 51 defined by the core member in such a manner as to prevent the core member from being collapsed by the pressure roller, while the spaced annular ridges 16b of the pressure roller defined by the recesses press against the overlapping portions of the adjacent turns of the strip, to thereby weld the softened overlapping portions together as well as to bond the overlapping portions to the periphery of the core member to form a corrugated tube 50 having helical convolutions therearound.

As the strip 14 and core member 15 continue to be fed onto the mandrel 10, the corrugated tube 50 being formed is successively advanced toward the forward end of the mandrel with the overlapping portions of the adjacent turns of the strip being firmly welded together during passage through the pressure roller 16, and then the tube 50 is set by being cooled externally and internally by the cooling fluid passed through the rollers 11. The thus finished corrugated tube 50 is continuously drawn off the forward end of the mandrel 10.

In this embodiment the core member 15 is in the form of a flexible tube made of polyethylene with the same properties as the material of which the strip 14 is made. As indicated above, the core member must be capable of expanding the corresponding outer overlapping portion of the strip to form a desired raised convolution 51 as it is embedded between the overlapping portions. The core member, therefore, must have not only a cross-sectional area sufficient to bulge the strip into a convolution, but also a crushing strength sufficient to provide support for the strip 14 as it is fed in a flat condition and pressed on by the pressure roller 16 into an undulated convolution in conformity with the periphery of the core member and to impart adequate crushing strength to both the thus formed tube body and convolutions.

Figure 6:
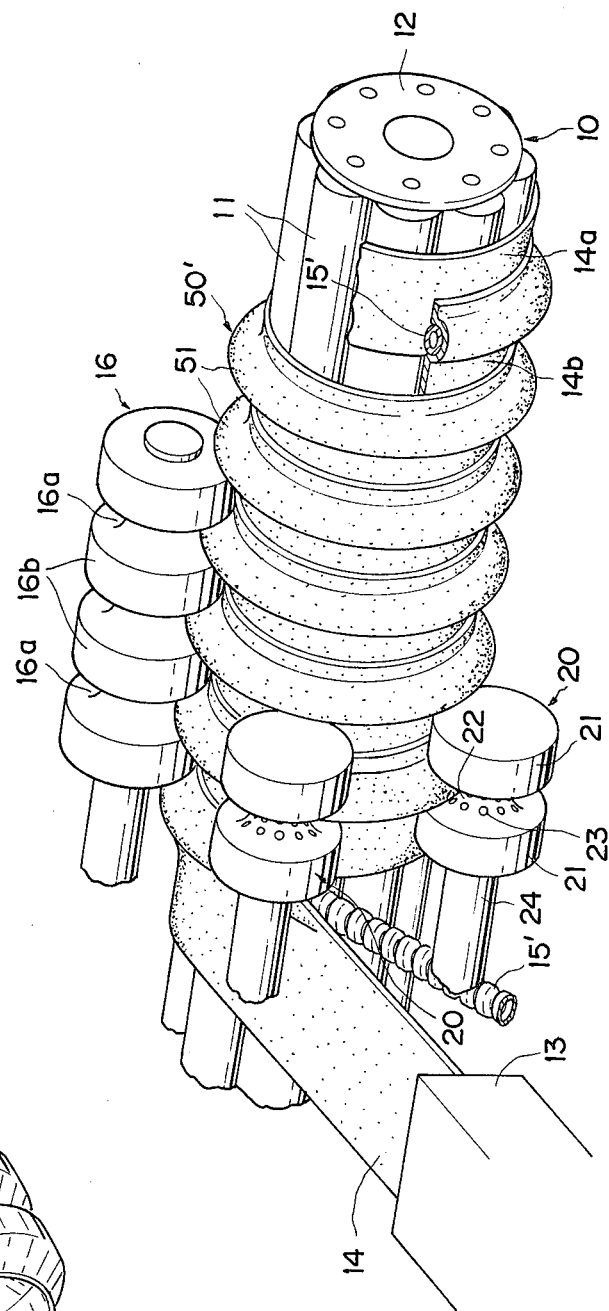
FIG. 6 is a partly broken away perspective view illustrating a corrugated tube with a corrugated core member according to the method of the present invention.
Figure 5:
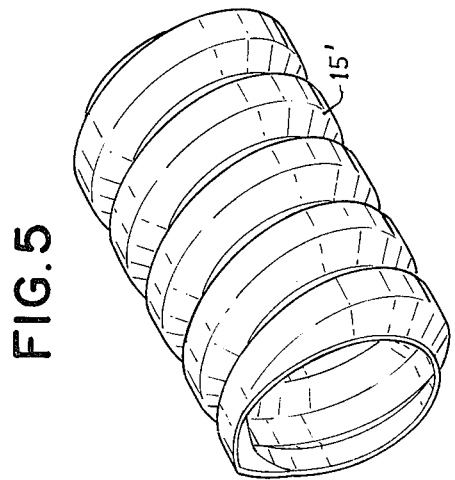
FIG. 5 is a perspective view of a part of a corrugated core member to be used in the method of the invention.

If desired, a corrugated tube having convolutions to define a corrugated outer wall with no inner wall smoothly formed may be used as the core member to increase the crushing strength of the core member during the process of manufacturing the corrugated tube of the invention while maintaining the desired flexibility of the core member to thereby prevent the core member from being deformed or crushed by the pressure roller 16. The corrugated tube which may be used as the core member may be manufactured, for example by the method described in copending U.S. Ser. No. 157,702, filed June 9, 1980, now U.S. Pat. No. 4,292,113. FIG. 5 shows the corrugated core member 15' manufactured by the method of U.S. Pat. No. 4,292,113. The corrugated tube 50' in FIG. 6 includes the corrugated core member 15', which is embedded between the overlapping portions of the preceeding turn 14a and the succeeding turn 14b like the corrugated core member 15 of the corrugated tube 50. In this case, the strip 14 is extruded through the die 13 in a softened state and is deposited on the core member 15'. Therefore, when the strip 14 and the core member 15' are pressed by the pressure roller 16, the corrugated tube 50' can be formed like the corrugated tube 50. To increase the crushing strength of the core member during manufacturing, fluid such as air may be injected into a core tube used as the core member.

As described above, the core member 15 defines a helical convolution 51 around the corrugated tube 50 as it is embedded between the overlapping portions of adjacent turns of the strip 14. The crushing strength under an external pressure of the thus produced corrugated tube varies depending upon not only the pitch but also the height and wall thickness of the convolutions. The crushing strength may be enhanced particularly by increasing the wall thicknesses of the top portion of the convolution as well as those wall portions of the tube connecting adjacent convolutions, in addition to increasing the height of the convolution. Thus, the core member having a cross-sectional configuration projecting far outwardly of the tube body as it is inserted between overlapping portions of the strip is effective in enhancing the crushing strength. The core member may thus be in the form of a tube having a rectangular cross-section, and in that case it is possible to make the opposed minor side walls of the rectangular hollow core member thicker than the major side walls, whereby the crushing strength of the core member and hence the corrugated tube may be increased.

Of course, the rectangular core member is described only by way of example, and the cross-section of the core may be circular, trapezoidal, or of any other appropriate shape. The cross-sectional shape of the helical convolution depends on the shape of the core member, and the crushing strength of the convolution depends on the material of which the core member is formed.

Since the core member 15 is inserted into the overlapping portions of adjacent turns of the strip concurrently with helically wrapping the strip to produce a tube, it is possible to insert the core member irrespective of the cross-sectional configuration thereof, as stated before, the material for the core member is preferably the same as that for the strip as they are well compatible with each other and integrally welded together to provide a strong tube. However, a rope-like member may also be used as a core member without departing from the scope of the invention. Such a rope-like core member having flexibility and fuzzes around its periphery is advantageous in that it is easily integrally bonded to the heat softened strip wrapped around the core member.

One or more forming rollers 20 may be provided to shape the convolution 51 around the corrugated tube 50. The forming roller 20 comprises a pair of ridges 21 separated by a recessed portion 22 for receiving the convolution 51 in a softened state, the recessed portion being formed with a number of perforations 23 therearound which are connected through a hollow shaft 24 of the forming roller 20 with a vacuum source (not shown) to attract the convolution 51 against the recessed portion 22.

Figure 2:
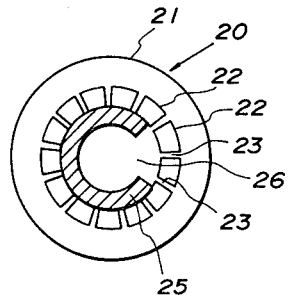
FIG. 2 is a cross-sectional view taken along line II—II in FIG. 1.

As shown in FIG. 2, the recessed portion 22 of the forming roller 20 is rotatably mounted on a fixed inner tube 25 having a longitudinal slot 26 which is provided at the location corresponding to the area of the recessed portion with which the convolution 51 is in contact. While the forming roller 20 is rotated, the slot 26 is at all times held in its fixed position so that only the perforations 23 at the region of the recessed portion 22 with which the convolution is in contact performs the suctioning action on the convolution.

When the convolutions 51 are pressure formed by the recesses 16a of the pressure roller 16 alone, the core member 15 may possibly be deformed or crushed under an increased pressure. However, if the forming roller 20 is used to exert the suctioning action on the convolution, the latter may be shaped in close conformity with the recessed portion 22 of the forming roller with no risk of the convolution being deformed or crushed.

The forming roller 20 must be positioned at a location where the strip 14 is still in a softened condition. Thus, one or more forming rollers may be disposed preferably adjacent the strip as extruded from the die 13.

Figure 3:
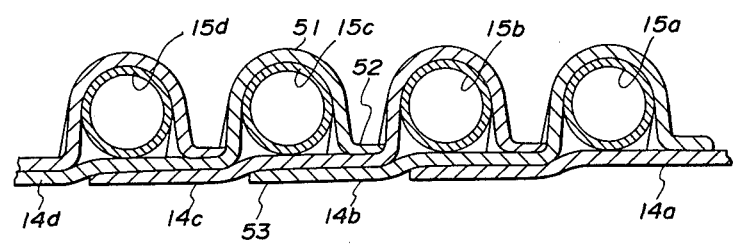
FIG. 3 is a diagrammatical partially cross-sectional view of a corrugated tube wall produced according to the method of the invention.

FIG. 3 illustrates the first to fourth turns 14a, 14b, 14c, 14d of the strip wrapped successively one over the other, with the second turn 14b wrapping over the first turn 15a of the core member 15, the third turn 14c of the strip over the second turn 15b of the core, the fourth turn 14d over the third turn 15c, the next turn of the strip over the fourth turn 15d of the core, and so forth. In the illustrated embodiment, the strip 14 is helically wound around the mandrel such that the upper periphery of each turn of the core member 15 is enveloped by a single ply of the strip to make each convolution 51 in a single thickness, that each valley 52 except the first one between the convolutions is formed by three plies of the strip, and that the inner wall portion 53 of the tube 50 beneath the corresponding convolution 51 except the first one is formed by two plies of the strip.

Figure 4:
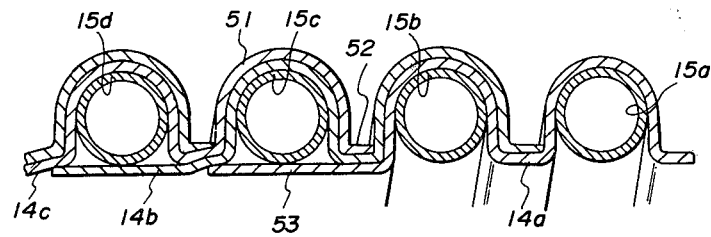
FIG. 4 is a diagrammatical partially cross-sectional view of another form of corrugated tube having a different tube wall structure manufactured according to the method of the invention.

In the embodiment shown in FIG. 4, the strip 14 is helically wound in such a manner that the first turn 14a of the strip envelops the first and second turns 15a, 15b of the core member, the second turn 14b of the strip envelops the second and third turns 15b, 15c of the core member, the third turn 14c of the strip envelops the third and fourth turns 15c, 15d of the core member, and so forth. As a result, each turn of the core member except the first one is wrapped in two plies of the strip to make each convolution except the first one in two thicknesses of the strip, each valley 52 except the first and second ones is formed in three thicknesses, and each inner wall portion 53 beneath the corresponding convolution 51 except the first and second ones is formed in a single thickness.

As will be noted from the embodiments of FIGS. 3 and 4, the wall thicknesses of the various portions of the corrugated tube 50 may be varied by changing the width of the strip 14 fed from the die and/or changing the manner of winding the strip. Furthermore, a corrugated tube of any desired diameter may be produced by selecting the thickness and width of the strip, the outer diameter of the rotating mandrel, the cross-sectional shape of the core member, the pitch of the grooved pressure roller, etc.

EXAMPLES OF THE INVENTION

Following is a table showing the comparisons between a typical prior art corrugated tube produced according to the method of copending U.S. Ser. No. 157,702 and the examples of corrugated tubes produced according to the present invention in each of which examples the strip was wound in such a manner that each turn of the strip envelops two turns of the core member with each turn of the core member wrapped in two thicknesses of the strip, as shown in FIG. 4. As the core member was used a corrugated tube produced according to the method of copending U.S. Ser. No.

157,702. Medium-low pressure polyethylene was used for both the strip and core member in every example of the present invention and also for the strip of the prior art reference. The extruding temperature of the strip was set at 180°–200° C. The other manufacturing conditions were the same for the present invention and the reference.

TABLE

|  | Example 1 | Example 2 | Example 3 |
| --- | --- | --- | --- |
| Corrugated tubes according to the present invention | | | |
| Thickness of strip (mm) | 1.0 | 2.7 | 3.4 |
| Width of strip (mm) | 150 | 250 | 500 |
| OD of hollow core member (mm) | 21 | 35 | 70 |
| Wall thickness of hollow core member (mm) | 0.5 | 0.8 | 1.7 |
| ID of finished tube (mm) | 280 | 468 | 932 |
| OD of finished tube (mm) | 324 | 544 | 1080 |
| Height of convolution (mm) | 22 | 38 | 74 |
| Pitch of convolutions (from crest to crest) (mm) | 42 | 70 | 140 |
| Pitch of convolutions of hollow core member (from crest to crest) (mm) | 4 | 7 | 13 |
| Height of convolution of hollow core member (mm) | 2.5 | 3.5 | 7.0 |
| Weight of finished tube (kg/m) | 4.1 | 10 | 45 |
| Crushing strength at 25% deformation (kg) | 420 | 617 | 1400 |
| Tubes according to the prior art | | | |
| Weight of finished tube (kg) | 4.0 | 9.9 | 40 |
| Crushing strength at 25% deformation | 320 | 475 | 1067 |

Note 1:
The dimensions of the prior art tubes were the same as those of the tubes of this invention except that no core member was used.
Note 2:
Crushing strength at 25% deformation was determined by placing the corrugated tube having a length of 500 mm between two parallel plates each having width of 200 mm and pressing the plates so that the pressure was applied at a direction perpendicular to the longitudinal axis of the tube. The strength was measured when the outer diameter was deformed at 25%.

As is evident from the above table, the process according to the present invention provides corrugated tubes having a markedly increased crushing strength in each of the examples as compared to the prior art standard tubes, and particularly provides highly reliable tubes for the large diameter.

While the present invention has been described with reference to the preferred embodiments, it is to be understood that various changes and modifications may be made without departing from the spirit and scope of the invention.

What is claimed is:

1. A method of continuously manufacturing a corrugated tube having axially extending spiral convolutions to define a corrugated outer wall configuration in longitudinal cross-section and a smooth inner wall surface along the length of the tube, comprising the steps of arranging in a circular array a plurality of rollers each rotating at the same speed such that an imaginary cylinder is defined about its central axis by said rollers, the longitudinal axes of said rollers being parallel to each other but offset with respect to said central axis: continuously feeding a flat non-reinforced strip of synthetic resin material in a softened state generally perpendicularly to the length of said rollers in such a manner that said strip is helically wrapped around and advanced axially along said imaginary cylinder with portions of adjacent turns of the strip overlapping one on another for welding together; continuously feeding a flexible core member and embedding it between the overlapping portions of adjacent turns of the strip to raise the upper one of said overlapping portions so as to define spiral raised convolutions around the tube, said flexible core member being in the form of a corrugated tube having convolutions therearound to define a corrugated outer wall; and pressing a pressure roller against the overlapping portions of the strip having said flexible core member embedded therein; whereby a corrugated tube is formed having spiral convolutions defined by the embedded flexible core member around the outer periphery of the tube along the length thereof and a smooth inner wall surface.

2. A method according to claim 1 including the step of passing fluid into said core member tube.

3. A method according to claim 1, including the step of shaping said convolutions by means of forming roller means adapted to attract the convolutions against the roller means by suctioning action while said strip remains in its softened state.

4. A method according to claim 3 wherein said forming roller means comprises at least one roller member having a central annular recessed portion for fittingly receiving said convolution, and a plurality of suction orifices provided radially through the recessed portion and spaced circumferentially of the recessed portion, a stationary inner pipe disposed coaxially with and within the roller member for loosely mounting the roller member for rotation about the pipe, and a vacuum source connected with said pipe, said inner pipe having a slot extending longitudinally through the wall thereof, said slot being positioned at a location corresponding to the contact area of said recessed portion with which the convolution is brought into contact so that only those of said suction orifices which are aligned with said slot at said contact area as the roller member rotates may exert suctioning action on the convolution.

5. A method of continuously manufacturing a corrugated tube having an outer wall with spiral convolutions and a smooth inner wall comprising the steps of:
arranging in a circular array a plurality of rollers extending parallel to each other to define a cylindrical contour, said rollers rotating in the same direction at the same speed;
continuously feeding a flat strip of a synthetic resin material in a softened state to said rollers forming the cylindrical contour at an angle so that said strip is helically wrapped around the rollers to advance axially therealong to thereby overlap adjacent turns of the strip one on another;
continuously feeding a flexible core member onto said flat strip so that when the succeeding turn of said flat strip is overlapped on the previous turn of said flat strip, the flexible core member is embedded between the overlapped turns of said flat strip, one longitudinal edge portion of the flat strip disposed on the core member being located adjacent to the core member of the previous turn and the other longitudinal edge portion of the flat strip extending beyond the previous turn of the flat strip to directly contact with the rollers to form a part of the smooth inner wall; and
pressing said flat strip onto at least one of the rollers forming the cylindrical contour to abut the flat strip onto at least both the previous turn of the flat strip and the core member disposed on the previous turn so that the abutting portion is bonded together and the smooth inner wall is formed; said pressing said flat strip at least including a first pressing stage for pressing said one longitudinal edge portion of the flat strip located adjacent to the core member of the previous turn onto the previous turn of the flat strip to connect said edge portion to the previous flat strip, shaping said convolutions into smooth configuration without depressions by forcibly attracting with a suction force the convolutions away from the rollers forming the cylindrical contour while the flat strip and the core member are still soft before hardening, and a second pressing stage for pressing said overlapped turns of said flat strip containing said edge portion of the flat strip in said first pressing stage and the core member located therebetween, so that the flat strip can be located on and bonded over the previous turn of the flat strip and the core member.

6. A method according to claim 5, wherein said pressing said flat strip further includes a third pressing stage for pressing the overlapped turn again after the second pressing stage so that the configuration of the convolutions is reshaped and the pitch of the convolutions can be perfectly set.

7. A method according to claim 6, wherein the step of pressing said flat strip having a plurality of pressing stages is performed by a pressure roller including a plurality of annular ridges and at least one annular recess, said annular recess being located between two annular ridges to define the convolution of the tube, said pressure roller being located parallel to the rollers defining the cylindrical contour and spaced at a predetermined distance away therefrom.

8. A method according to claim 6, wherein the flexible core member is in the form of a corrugated tube with a small diameter and a long length, said corrugated tube having a spiral convolution at an outer surface thereof.

* * * * *